United States Patent Office 3,793,334
Patented Feb. 19, 1974

3,793,334
4-BENZOYL-4-HYDROXY-3-PHENYL-
1-SUBSTITUTED PIPERIDINES
Anton Ebnoether, Arlesheim, and Erwin Rissi, Basel, Switzerland, assignors to Sandoz Ltd., doing business as Sandoz AG, Basel, Switzerland
No Drawing. Continuation-in-part of abandoned application Ser. No. 129,997, Mar. 31, 1971. This application Sept. 1, 1972, Ser. No. 285,747
Claims priority, application Switzerland, Apr. 8, 1970, 5,167/70, 5,168/70, 5,169/70; Dec. 4, 1970, 17,939/70
Int. Cl. C07d 29/36
U.S. Cl. 260—293.73
37 Claims

ABSTRACT OF THE DISCLOSURE

The invention concerns novel compounds of the formula:

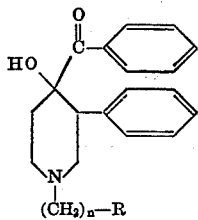

wherein
$n$ is an integer from 1 to 4, and
R is a group —CO—$R_1$,
wherein $R_1$ is hydroxy, alkyl of 1 to 4 carbon atoms, alkoxy of 1 to 4 carbon atoms, amino, alkylamino, dialkylamino, phenyl, chloro-phenyl, bromo-phenyl, fluoro-phenyl, alkyl-phenyl in which the alkyl radical is of 1 to 4 carbon atoms, methoxy-phenyl or methylthio-phenyl,
or a

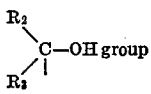

wherein each of $R_2$ and $R_3$ is hydrogen or alkyl of 1 to 4 carbon atoms,
and pharmaceutically acceptable acid addition salts thereof.
The compounds are hypolipemics, particularly hypocholesteremics, useful in the prophylaxis or treatment of arteriosclerosis.

---

This is a continuation-in-part of our pending application Ser. No. 129,997, filed Mar. 31, 1971, now abandoned.
This invention relates to benzoyl phenylpiperidine derivatives.
In accordance with the invention there are provided new compounds of Formula I,

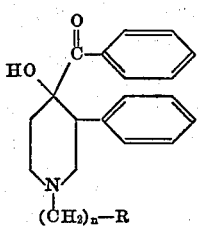

wherein
$n$ is an integer from 1 to 4, and
R is a group —CO—$R_1$, wherein $R_1$ is hydroxy, alkyl of 1 to 4 carbon atoms, alkoxy of 1 to 4 carbon atoms, amino, alkylamino, dialkylamino, phenyl, chloro-phenyl, bromo-phenyl, fluoro-phenyl, alkyl-phenyl in which the alkyl radical is of 1 to 4 carbon atoms, methoxy-phenyl or methylthio-phenyl,
or a

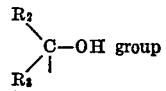

wherein each of $R_2$ and $R_3$ is hydrogen or alkyl of 1 to 4 carbon atoms,
and acid addition salts thereof.
Further, in accordance with the invention a compound of Formula I is obtained by a process comprising reacting the compound of Formula II,

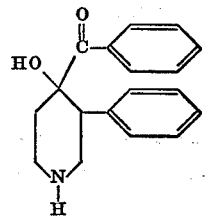

(a) with a compound of Formula IIIa, $$Y—(CH_2)_n—R \qquad (IIIa)$$

wherein
$n$ and R are as defined above, and
Y is the acid radical of a reactive ester,
in the presence of an acid-binding agent, or
(b) with a compound of Formula IIIb, $$CH_2=CH—CO—R_1 \qquad (IIIb)$$

wherein $R_1$ is as defined above,
in an inert solvent, to obtain a compound of Formula Ia,

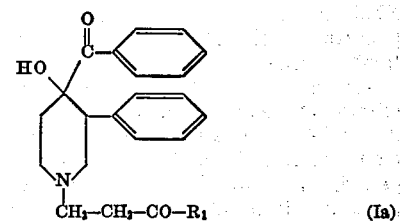

wherein $R_1$ is as defined above, or
(c) with formaldehyde and a compound of Formula IIIc, $$CH_3—CO—R_4 \qquad (IIIc)$$

wherein $R_4$ is tert.butyl, phenyl, chloro-phenyl, bromo-phenyl, fluoro-phenyl, alkyl-phenyl in which the alkyl radical is of 1 to 4 carbon atoms, methoxy-phenyl or methylthio-phenyl,
in a neutral or weakly acid medium, to obtain a compound of Formula Ib,

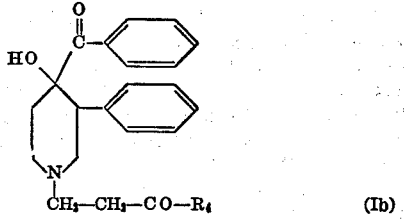

wherein $R_4$ is as defined above, or (d) with a compound of Formula IIId,

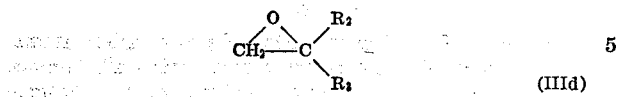

(IIId)

wherein $R_2$ and $R_3$ are as defined above, in an inert solvent, to obtain a compound of Formula Ic,

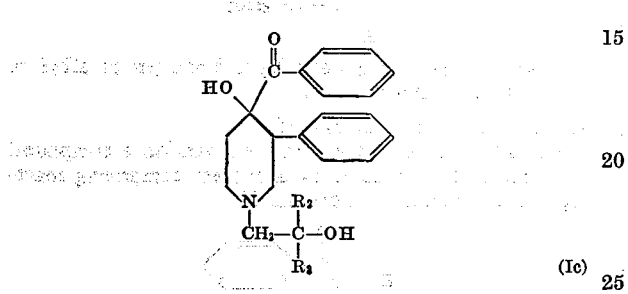

(Ic)

wherein $R_2$ and $R_3$ are as defined above.

The resulting compound of Formula I may be isolated in the form of a free base or as an acid addition salt thereof.

In variant (a) of the process of the invention, it is preferred to use a compound of Formula IIIa wherein the radical Y is halogen or an alkyl- or aryl-sulphonic acid radical such as the methane-, benzene- or p-toluene-sulphonic acid radical. The reaction is preferably effected in an inert solvent, e.g. a chlorinated hydrocarbon such as chloroform, an aromatic hydrocarbon such as toluene, or a di(lower)alkyl amide of a lower aliphatic carboxylic acid, such as dimethyl formamide. The reaction is preferably effected at a temperature from 50° C. to the boiling temperature of the reaction mixture and under suitable conditions has a duration of approximately 1 to 25 hours. Examples of suitable acid-binding agents are alkali metal carbonates such as sodium carbonate or potassium carbonate, or tertiary organic bases such as triethyl amine.

Variant (b) of the process may, for example, be effected by dissolving the compound of Formula II in an inert solvent, e.g. a lower alkanol such as ethanol, adding a compound of Formula IIIb and reacting for an extended period, e.g. 2 to 10 hours, at an elevated temperature, preferably from 50° C. to the boiling temperature of the reaction mixture. If desired, a strong basic condensation agent, e.g. benzyl trimethyl ammonium hydroxide, may be present.

In accordance with variant (c) of the process, the compound of Formula II or a salt thereof is reacted under the conditions of a Mannich reaction with formaldehyde and a compound of Formula IIIc in a neutral or weakly acid medium, preferably in an inert solvent, e.g. a lower alcohol such as ethanol. The reaction is suitably effected at an elevated temperature, preferably at a temperature between 50° C. and the boiling temperature of the reaction mixture.

In process variant (d), the inert solvent is preferably a lower alkanol such as methanol, or an aromatic hydrocarbon such as benzene, or a chlorinated hydrocarbon such as chloroform. The reaction is suitably effected at a temperature between 0° and 100° C., and is suitably carried out in a sealed vessel if the epoxide is normally gaseous at the reaction temperature.

The resulting compounds of Formula I may be worked up and purified in accordance with known methods.

The compound of Formula II may, for example, be produced by hydrolyzing a compound of Formula IV,

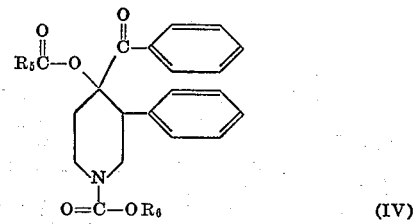

(IV)

wherein $R_5$ and $R_6$ are lower alkyl, preferably methyl or ethyl, in an acid or alkaline medium.

Compounds of Formula IV may, for example, be obtained by acylating a compound of Formula V,

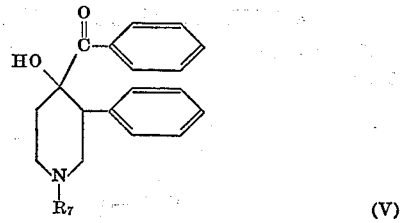

(V)

wherein $R_7$ is methyl or benzyl, and subsequently reacting with a chloroformic acid ester, preferably chloroformic acid ethyl ester.

Compounds of Formula V may, for example, be obtained by chlorinating or brominating a compound of Formula VI,

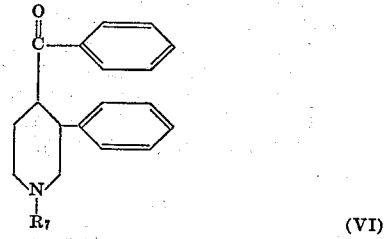

(VI)

wherein $R_7$ is as defined above, in the 4 position of the piperidine rings, by reaction with chlorine or bromine, reacting the resulting reaction product with an alkali metal alcoholate and subsequently treating the reaction mixture with an acid.

Compounds of Formula VI may be produced by reacting a compound of Formula VII,

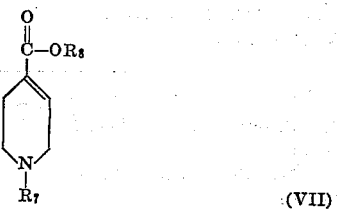

(VII)

wherein $R_7$ is as defined above, and
$R_8$ is lower alkyl, with a Grignard compound of Formula VIII,

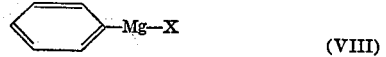

(VIII)

wherein X is chlorine, bromine or iodine, and hydrolyzing the resulting reaction product.

Insofar as the production of the starting materials is not particularly described, these are known or may be produced in acordance with known processes or in a manner analogous to the processes described herein.

The compounds of Formula I and pharmaceutically acceptable acid addition salts thereof are useful because they possess pharmacological activity in animal tests. More particularly, the compounds are useful hypolipemics, particularly hypocholesteremics, suitable for prophylaxis or treatment of arteriosclerosis, as indicated by total lipid content and cholesterin content determinations in rats [following generally the methods of Zöllner and Kirsch (Z. ges. exp. Med. 135, 545 (1962) and Levine and Zak (Clin. Chim. Acta 10, 381 (1964), respectively].

For the abovementioned use the dosage employed will naturally vary depending on the compound used, the mode of administration and the treatment desired. However, in general, satisfactory results are obtained at a dosage of from 30 to 150 mg./kg. animal body weight, conveniently given in divided doses two to three times a day or in sustained released form. For the larger mammals the daily dosage is from about 30 to 300 mg. and unit dosage forms suitable for oral administration contain from about 10 to about 150 mg. of the compound, in association with a pharmaceutical carrier or diluent.

Suitable salt forms include mineral acid salts such as the hydrochloride, hydrobromide and sulphate, and organic acid salts such as the fumarate, maleate, tartrate, methane-, ethane- and benzene-sulphonate, citrate and malate, which may be prepared in conventional manner.

The invention also provides a pharmaceutical composition comprising as active agent a compound of Formula I or a pharmaceutically acceptable acid addition salt thereof, in association with a pharmaceutically acceptable carrier or diluent.

The compounds of Formula I which contain methyl groups in the radical R are particularly interesting, and especially so in (4-benzoyl-4-hydroxy-3-phenylpiperidino) acetonet.

In the following non-limitative examples all temperatures are indicated in degrees centigrade and are uncorrected.

Example 1.—3-(4-benzoyl-4-hydroxy-3-phenylpiperidino)-2-methyl-2-propanol [process(a)]

A solution of 7.75 g. of 1-chloro-2-hydroxy-2-methylpropane in 50 cc. of dimethyl formamide is added dropwise at 60° to a suspension of 20.0 g. of 4-benzoyl-4-hydroxy-3-phenylpiperidine and 10.8 g. of potassium carbonate in 100 cc. of dimethyl formamide. The reaction mixture is stirred at 80° for a further 18 hours and is subsequently poured into an ice-cold solution of 100 g. of potassium carbonate in 1000 cc. of water. The reaction mixture is repeatedly extracted with methylene chloride, the extracts are dried over magnesium sulphate and the solvent is removed by evaporation at reduced pressure. The evaporation residue is dissolved in 100 cc. of isopropanol and the calculated amount of hydrogen bromide in glacial acetic acid is added to the solution. The resulting crystalline product is recrystallized from ethanol, whereby pure 3-(4-benzoyl-4-hydroxy-3-phenylpiperidino)-2-methyl-2-propanol, having a M.P. of 130–134°, is obtained.

The starting material may be obtained as follows:

(a) 4-Benzoyl-1-methyl-3-phenylpiperidine.—10.1 g. of magnesium are covered with a layer of 20 cc. of absolute tetrahydrofuran and a few crystals of iodine and 0.5 cc. of ethylene bromide are added. A solution of 65.0 g. of bromobenzene in 80 cc. of absolute tetrahydrofuran is then added dropwise at such a rate that the reaction is kept going. The reaction mixture is subsequently boiled for 2 hours, is cooled to 5°, and a solution of 30.0 g. of 1,2,3,6-tetrahydro-1-methylisonicotinic acid ethyl ester in 50 cc. of absolute tetrahydrofuran is added at this temperature during the course of 15 to 20 minutes. The mixture is heated to the boil for 30 minutes, is cooled to 10° and is poured into a solution of 60 g. of ammonium chloride in 400 cc. of ice water while stirring well. The resulting aqueous suspension is extracted several times with methylene chloride and the extract is shaken out with 2 N hydrochloric acid solution. The acid solutions are made alkaline, while cooling with a concentrated caustic soda solution, are extracted with methylene chloride, and the extracts are dried over potassium carbonate and concentrated by evaporation at reduced pressure. The residue is distilled in a high vacuum, whereby 1-methyl-3-phenyl-isonipecotinic acid ethyl ester, having a B.P. of 100–110°/0.05 mm. of Hg, first distills over as preliminary running, and then 4-benzoyl-1-methyl-3-phenylpiperidine distils at about 165–180°/0.05 mm. of Hg. Addition of hydrogen bromide to the free base yields 4-benzoyl-1-methyl-3-phenylpiperidine hydrobromide, having a M.P. of 243–244° (decomp.).

(b) 4-Benzoyl-4-bromo-1-methyl-3-phenylpiperidine.—147 g. of bromine are added at 100° during the course of 5 hours to a solution of 165.7 g. of 4-benzoyl-1-methyl-3-phenylpiperidine hydrobromide in 1700 cc. of glacial acetic acid, whereupon the reaction mixture is stirred at the same temperature for a further hour. The reaction mixture is allowed to stand at room temperature over night, is subsequently concentrated by evaporation at reduced pressure at 60° and acetone is added to the residue. After allowing to crystallize in a refrigerator, pure 4-benzoyl-4-bromo-1-methyl-3-phenylpiperidine hydrobromide, having a M.P. of 163–164° (slight decomp.), is obtained.

(c) 4-benzoyl-4-hydroxy-1-methyl-3-phenylpiperidine.—148.4 g. of 4-benzoyl-4-bromo-1-methyl-3-phenylpiperidine hydrobromide are added portionwise while cooling with ice to a solution of 23.3 g. of sodium in 700 cc. of methanol. The reaction mixture is stirred at room temperature for 22 hours and concentrated hydrochloric acid is subsequently added dropwise to the reaction mixture until an acid reaction to Congo red is obtained. The mixture is stirred for a further 15 minutes and the methanol is then removed by evaporation at reduced pressure at 60°. A 20% potassium carbonate solution is added to the residue, whereupon extraction is repeatedly effected with chloroform. The combined chloroform extracts are dried over magnesium sulphate, filtered and concentrated by evaporation at reduced pressure until crystallization commences. The reaction mixture is allowed to stand in a refrigerator over night, whereby pure 4-benzoyl-4-hydroxy-1-methyl-3-phenylpiperidine, having a M.P. of 167–169°, is obtained.

(d) 4-acetoxy-4-benzoyl-1-methyl-3-phenylpiperidine.—197.4 g. of 4-benzoyl-4-hydroxy-1-methyl-3-phenylpiperidine are dissolved at 90° in 2000 cc. of acetic anhydride, and the solution is slowly heated to 160°. The reaction mixture is cooled to about 100°, and the excess acetic anhydride is removed by distillation in a water pump vacuum. The resulting viscous residue is taken up in chloroform and shaken out with cold dilute sodium hydroxide solution. The organic layer is dried over magnesium sulphate, the solvent is removed by evaporation at reduced pressure, and the resulting residue is recrystallized once from about 2000 cc. of ethanol. Pure 4-acetoxy-4-benzoyl-1-methyl-3-phenylpiperidine, having a M.P. of 158–159°, is obtained.

(e) 4-acetoxy-4-benzoyl-3-phenylpiperidine-carboxylic acid ethyl ester.—392 cc. of chloroformic acid ethyl ester are added to a solution of 206.7 g. of 4-acetoxy-4-benzoyl-1-methyl-3-phenylpiperidine in 2000 cc. of absolute benzene, and the reaction mixture is heated to the boil while stirring for 16 hours. The reaction mixture is subsequently extracted thrice with water, the organic phase is dried over magnesium sulphate and evaporated to dryness. After crystallizing the residue from benzene, pure 4-acetoxy-4-benzoyl-3-phenylpiperidine-carboxylic acid ethyl ester, having a M.P. of 125–126°, is obtained.

(f) 4-benzoyl-4-hydroxy-3-phenylpiperidine.—216.1 g. of 4-acetoxy-4-benzoyl-3-phenylpiperidine-carboxylic acid ethyl ester are suspended in a mixture of 1500 cc. of concentrated hydrochloric acid and 500 cc. of water, and the suspension is heated to the boil while stirring for 72 hours. The product resulting after cooling the reaction mixture is filtered off and is recrystallized once from ethanol, whereby pure 4-benzoyl-4-hydroxy-3-phenylpiperidine hydrochloride, having a M.P. of 236–237°, is obtained.

Example 2.—(4-benzoyl-4-hydroxy-3-phenylpiperidino) acetone 4-benzoyl-4-hydroxy-3-phenylpiperidine is reacted with chloroacetone in accordance with the process described in Example 1. Reaction period 1.5 hours at 60°. The hydrobromide of the title compound has a M.P. of 201–203° (decomp., from isopropanol/ethanol).

Example 3.—2-(4-benzoyl-4-hydroxy-5-phenylpiperidino) acetophenone 4-benzoyl-4-hydroxy-3-phenylpiperidine is reacted with 2-chloroacetophenone in accordance with the process described in Example 1. Reaction period after the dropwise addition 1.5 hours at 60°. The hydrochloride of the title compound has a M.P. of 226–227° (from methanol).

Example 4.—4-(4-benzoyl-4-hydroxy-3-phenylpiperidino) 2-butanone 4-benzoyl-4-hydroxy-3-phenylpiperidine is reacted with 4-chloro-2-butanone in accordance with the process described in Example 1. The hydrobromide of the title compound has a M.P. of 167–169° (from ethanol).

Example 5.—3-(4-benzoyl-4-hydroxy-3-phenylpiperidino) propiophenone 4-benzoyl-4-hydroxy-3-phenylpiperidine is reacted with 3-bromopropiophenone in accordance with the process described in Example 1. The hydrobromide of the title compound has a M.P. of 182–184° (from ethanol).

Example 6.—4-(4-benzoyl-4-hydroxy-3-phenylpiperidino)-p-fluorobutyrophenone 4-benzoyl-4-hydroxy-3-phenylpiperidine is reacted with 4-chloro-p-fluorobutyrophenone in accordance with the process described in Example 1. Working up is effected by dissolving the crude title compound together with the calculated amount of fumaric acid in ethanol. The reaction mixture is again concentrated by evaporation and the residue recrystalized from acetone. For further purification the resulting hydrogen fumarate is again recrystallized once from methanol/ether and once from ethanol. The hydrogen fumarate of the title compound has a M.P. of 130°.

Example 7.—5-(4-benzoyl-4-hydroxy-3-phenyl-piperidino)-2-methyl-3-pentanone 4-benzoyl-4-hydroxy-3-phenylpiperidine hydrochloride is reacted with 5-chloro-2-methylpentanone in accordance with the process described in Example 1. Reaction period 8 hours at 60°. The hydrochloride of the title compound has a M.P. of 193–195° (from ethanol).

Example 8.—3-(4-benzoyl-4-hydroxy-3-phenylpiperidino) propanol 4-benzoyl-4-hydroxy-3-phenylpiperidine hydrochloride is reacted with 3-chloropropanol in accordance with the process described in Example 1. Reaction period 20 hours at 60°. The title compound has a M.P. of 122–124° (from benzene/petroleum ether).

Example 9.—4-(4-benzoyl-4-hydroxy-3-phenylpiperidino) butanol 4-benzoyl-4-hydroxy-3-phenylpiperidine hydrochloride is reacted with 4-chlorobutanol in accordance with the process described in Example 1. Reaction period 20 hours at 60°. The hydrobromide of the title compound has a M.P. of 145–147° (from ethanol/ether).

Example 10.—5-(4-benzoyl-4-hydroxy-3-phenylpiperidino)-2-pentanone 4-benzoyl-4-hydroxy-3-phenylpiperidine hydrochloride is reacted with 5-chloro-2-pentanone in accordance with the process described in Example 1. Reaction period 15 hours at 100°. The hydrochloride of the title compound has a M.P. of 167–168° (from isopropanol).

Example 11.—6-(4-benzoyl-4-hydroxy-3-phenylpiperidino)-2-hexanone 4-benzoyl-4-hydroxy-3-phenylpiperidine hydrochloride is reacted with 6-chloro-2-hexanone in accordance with the process described in Example 1. Reaction period 15 hours at 100°. The hydrochloride of the title compound has a M.P. of 127–134° (from water).

Example 12.—4-(4-benzoyl-4-hydroxy-3-phenylpiperidino)-2,2-dimethyl-3-butanone 4-benzoyl-4-hydroxy-3-phenylpiperidine hydrochloride is reacted with 4-chloro-2,2-dimethyl-3-butanone in accordance with the process described in Example 1. Reaction period 15 hours at 100°. The hydrogen fumarate of the title compound has a M.P. of 179–182° (from isopropanol).

Example 13.—2-(4-benzoyl-4-hydroxy-3-phenylpiperidino) acetic acid methyl ester 4-benzoyl-4-hydroxy-3-phenylpiperidine hydrochloride is reacted with chloroacetic acid methyl ester in accordance with the process described in Example 1. Reaction period 15 hours at 100°. The fumarate of the title compound has a M.P. of 84–90° (from acetone/ether).

Example 14.—4-(4-benzoyl-4-hydroxy-3-phenylpiperidino) butyric acid ethyl ester 4-benzoyl-4-hydroxy-3-phenylpiperidine hydrochloride is reacted with 4-chlorobutyric acid ethyl ester in accordance with the process described in Example 1. Reaction period 15 hours at 100°. The hydrogen fumarate of the title compound has a M.P. of 142–144° (from acetone/ether).

Example 15.—4-(4-benzoyl-4-hydroxy-3-phenylpiperidino) butyric acid 4-benzoyl-4-hydroxy-3-phenylpiperidine hydrochloride is reacted with 4-chlorobutyric acid in accordance with the process described in Example 1. Reaction period 15 hours at 100°. The title compound has a M.P. of 216–222° (from methanol/water).

Example 16.—2-(4-benzoyl-4-hydroxy-3-phenylpiperidino) acetic acid 4-benzoyl-4-hydroxy-3-phenylpiperidine hydrochloride is reacted with chloroacetic acid in accordance with the process described in Example 1. Reaction period 15 hours at 100°. The title compound has a M.P. of 218–221° (from methanol/water).

Example 17.—2-(4-benzoyl-4-hydroxy-3-phenylpiperidino) acetamide 4-benzoyl-4-hydroxy-3-phenylpiperidine hydrochloride is reacted with chloroacetamide in accordance with the process described in Example 1. Reaction period 15 hours at 100°. The title compound has a M.P. of 182–185° (from methanol).

Example 18.—5-(4-benzoyl-4-hydroxy-3-phenylpiperidino)-2,2-dimethyl-3-pentanone 4-benzoyl-4-hydroxy-3-phenylpiperidine is reacted with 5-chloro-2,2-dimethyl-3-pentanone in accordance with the process described in Example 1. The hydrobromide of the title compound has a M.P. of 187–188.5° (from ethanol).

Example 19.—5-(4-benzoyl-4-hydroxy-3-phenylpiperidino)-3-pentanone 4-benzoyl-4-hydroxy-3-phenylpiperidine is reacted with 5-chloro-3-pentanone in accordance with the process described in Example 1. The hydrochloride of the title compound has a M.P. of 185–187° (decomp., from ethanol).

Example 20.—6-(4-benzoyl-4-hydroxy-3-phenylpiperidino)-2-methyl-4-hexanone 4-benzoyl-4-hydroxy-3-phenylpiperidine is reacted with 6-chloro-2-methyl-4-hexanone in accordance with the process described in Example 1. The hydrochloride of the title compound has a M.P. of 162–164° (slight decomp., from ethanol).

Example 21.—3-(4-benzoyl-4-hydroxy-3-phenylpiperidino) propionic acid ethyl ester 4-benzoyl-4-hydroxy-3-phenylpiperidine is reacted with 3-chloropropionic acid ethyl ester in accordance with the process described in Example 1. The hydrochloride of the title compound has a M.P. of 205–206° (from ethanol).

Example 22.—3-(4-benzoyl-4-hydroxy-3-phenylpiperidino) propionic acid 4-benzoyl-4-hydroxy-3-phenylpiperidine is reacted with 3-chloropropionic acid in accordance with the process described in Example 1. The hydrochloride of the title compound has a M.P. of 178–179.5° (from water).

Example 23.—3-(4-benzoyl-4-hydroxy-3-phenylpiperidino)-N-methyl-propionamide 4-benzoyl-4-hydroxy-3-phenylpiperidine is reacted with 3-chloropropionic acid N-methyl amide in accordance with the process described in Example 1. The title compound has a M.P. of 193–196° (from methanol).

Example 24.—3-(4-benzoyl-4-hydroxy-3-phenylpiperidino)-N,N-diethyl-propionamide 4-benzoyl-4-hydroxy-3-phenylpiperidine is reacted with 3-chloropropionic acid N,N-diethyl amide in accordance with the process described in Example 1. The hydrochloride monohydrate of the title compound has a M.P. of 110–115° (from water).

Example 25.—3-(4-benzoyl-4-hydroxy-3-phenylpiperidino)-2-propanol 4-benzoyl-4-hydroxy-3-phenylpiperidine is reacted with 3-chloro-2-propanol in accordance with the process described in Example 1. The title compound has a M.P. of 134.5–135.5° (from ethanol).

Example 26.—2-(4-benzoyl-4-hydroxy-3-phenylpiperidino) ethanol 4-benzoyl-4-hydroxy-3-phenylpiperidine is reacted with 2-chloroethanol in accordance with the process described in Example 1. The title compound has a M.P. of 113–114.5° (from isopropanol/ether).

Example 27.—4-(4-benzoyl-4-hydroxy-3-phenylpiperidino)-3-butanol 4-benzoyl-4-hydroxy-3-phenylpiperidine is reacted with 4-chloro-3-butanol in accordance with the process described in Example 1. The title compound has a M.P. of 129–130° (from benzene/petroleum ether).

Example 28.—3-(4-benzoyl-4-hydroxy-3-phenylpiperidino)-p-methoxy-propiophenone 4-benzoyl-4-hydroxy-3-phenylpiperidine is reacted with 3-chloro-p-methoxy-propiophenone in accordance with the process described in Example 1. The hydrobromide of the title compound has a M.P. of 170–172° (from ethanol).

Example 29.—3-(4-benzoyl-4-hydroxy-3-phenylpiperidino)-p-fluoro-propiophenone 4-benzoyl-4-hydroxy-3-phenylpiperidine is reacted with 3-chloro-p-fluoro-propiophenone in accordance with the process described in Example 1. The hydrobromide of the title compound has a M.P. of 116–118° (from ethanol).

Example 30.—3-(4-benzoyl-4-hydroxy-3-phenylpiperidino)-p-chloro-propiophenone 4-benzoyl-4-hydroxy-3-phenylpiperidine is reacted with 3-chloro-p-chloro-propiophenone in accordance with the process described in Example 1. The hydrobromide of the title compound has a M.P. of 119–121° (from ethanol).

Example 31.—3-(4-benzoyl-4-hydroxy-3-phenylpiperidino)-p-bromo-propiophenone 4-benzoyl-4-hydroxy-3-phenylpiperidine is reacted with 3-bromo-p-bromo-propiophenone in accordance with the process described in Example 1. The hydrobromide of the title compound has a M.P. of 177° (from ethanol).

Example 32.—3-(4-benzoyl-4-hydroxy-3-phenylpiperidino)-m-methoxy-propiophenone 4-benzoyl-4-hydroxy-3-phenylpiperidine is reacted with 3-chloro-m-methoxy-propiophenone in accordance with the process described in Example 1. The hydrobromide of the title compound has a M.P. of 165–166.5° (from ethanol).

Example 33.—3-(4-benzoyl-4-hydroxy-3-phenylpiperidino)-m-methyl-propiophenone 4-benzoyl-4-hydroxy-3-phenylpiperidine is reacted with 3-chloro-m-methyl-propiophenone in accordance with the process described in Example 1. The hydrobromide of the title compound has a M.P. of 163–164° (from ethanol/ether).

Example 34.—4-(4-benzoyl-4-hydroxy-3-phenylpiperidino)-2-butanone [process (b)]

A solution of 20.0 g. of 4-benzoyl-4-hydroxy-3-phenylpiperidine and 5.0 g. of methylvinylketone in 200 cc. of ethanol is heated to the boil for 3 hours and is subsequently evaporated to dryness. The residue is chromatographed on silica gel, whereby the reaction product is eluted with chloroform/methanol 99:1. The base is converted into the hydrobromide by dissolving the elution residue in ethanol, adding the calculated amount of hydrogen bromide/glacial acetic acid and allowing to crystallize. After recrystallizing the resulting crystalline product from ethanol, the pure hydrobromide of the title compound, having a M.P. of 167–169°, is obtained.

Example 35.—3-(4-benzoyl-4-hydroxy-3-phenylpiperidino) propionic acid amide [process (b)]

A mixture of 20.0 g. of 4-benzoyl-4-hydroxy-3-phenylpiperidine and 5.1 g. of acrylic acid amide in 200 cc. of ethanol is heated to the boil while stirring for 6½ hours. The reaction mixture is evaporated to dryness at reduced pressure and the residue is crystallized from a mixture of ethanol/petroleum ether. A further recrystallization from ethanol yields the pure title compound, having a M.P. of 151–151.5°.

Example 36.—5-(4-benzoyl-4-hydroxy-3-phenylpiperidino)-2,2-dimethyl-3-pentanone [process (b)]

A solution of 14.1 g. of 4-benzoyl-4-hydroxy-3-phenylpiperidine and 6.3 g. of tert.butylvinylketone in 200 cc. of ethanol is heated to the boil under reflux for 2 hours and is subsequently evaporated to dryness. The resulting residue is dissolved in ether, the calculated amount of hydrogen bromide in glacial acetic acid is added and the solvent is again evaporated. The resulting crude hydrobromide is recrystallized twice from ethanol and yields the pure hydrobromide of the title compound, having a M.P. of 187–188.5°.

Example 37.—5-(4-benzoyl-4-hydroxy-3-phenylpiperidino)-3-pentanone 4-benzoyl-4-hydroxy-3-phenylpiperidine is reacted with ethylvinylketone in accordance with the process described in Example 36. The hydrochloride of the title compound has a M.P. of 185–187° (decomp., from ethanol).

Example 38.—6-(4-benzoyl-4-hydroxy-3-phenyl-
piperidino)-2-methyl-4-hexanone 4-benzoyl-4-hydroxy-3-phenylpiperidine is reacted with 2-methylpropyl-vinylketone in accordance with the process described in Example 36. The hydrochloride of the title compound has a M.P. of 162–164° (slight decomp. from ethanol).

Example 39.—3-(4-benzoyl-4-hydroxy-3-phenyl-
piperidino) propionic acid ethyl ester 4-benzoyl-4-hydroxy-3-phenylpiperidine is reacted with acrylic acid ethyl ester in accordance with the process described in Example 36. The hydrochloride of the title compound has a M.P. of 205–206° (from ethanol).

Example 40.—3-(4-benzoyl-4-hydroxy-3-phenyl-
piperidino) propionic acid 4-benzoyl-4-hydroxy-3-phenylpiperidine is reacted with acrylic acid in accordance with the process described in Example 36. Reaction period 15 hours at the boil. The hydrochloride of the title compound has a M.P. of 178–179.5° (from water).

Example 41.—3-(4-benzoyl-4-hydroxy-3-phenyl-
piperidino)-N-methyl-propionamide 4-benzoyl-4-hydroxy-3-piperidine is reacted with acrylic acid N-methyl amide in accordance with the process described in Example 36. Reaction period 15 hours at the boil. The title compound has a M.P. of 193–196° (from methanol).

Example 42.—3-(4-benzoyl-4-hydroxy-3-phenyl-
piperidino)-N,N-diethyl-propionamide 4-benzoyl-4-hydroxy-3-phenylpiperidine is reacted with acrylic acid N,N-diethyl amide in accordance with the process described in Example 36. Reaction period 15 hours at the boil. The hydrochloride monohydrate of the title compound has a M.P. of 110–115° (from water).

Example 43.—5-(4-benzoyl-4-hydroxy-3-phenyl-
piperidino)-2-methyl-3-pentanone 4-benzoyl-4-hydroxy-3-phenylpiperidine is reacted with isopropyl-vinylketone in accordance with the process described in Example 36. The hydrochloride of the title compound has a M.P. of 193–195° (from ethanol).

Example 44.—3-(4-benzoyl-4-hydroxy-3-phenyl-
piperidino) propiophenone 4-benzoyl-4-hydroxy-3-phenylpiperidine is reacted with phenyl-vinylketone in accordance with the process described in Example 36. The hydrochloride of the title compound has a M.P. of 182–184° (from ethanol).

Example 45.—3-(4-benzoyl-4-hydroxy-3-phenyl-
piperidino)-p-methoxy-propiophenone 4-benzoyl-4-hydroxy-3-phenylpiperidine is reacted with p-methoxyphenyl-vinylketone in accordance with the process described in Example 36. The hydrobromide of the title compound has a M.P. of 170–172° (from ethanol).

Example 46.—3-(4-benzoyl-4-hydroxy-3-phenyl-
piperidino)-p-fluoro-propiophenone 4-benzoyl-4-hydroxy-3-phenylpiperidine is reacted with p-fluorophenyl-vinylketone in accordance with the process described in Example 36. The hydrobromide of the title compound has a M.P. of 116–118° (from ethanol).

Example 47.—3-(4-benzoyl-4-hydroxy-3-phenyl-
piperidino)-p-chloro-propiophenone 4-benzoyl-4-hydroxy-3-phenylpiperidine is reacted with p-chlorophenyl-vinylketone in accordance with the process described in Example 36. The hydrobromide of the title compound has a M.P. of 119–121° (from ethanol).

Example 48.—3-(4-benzoyl-4-hydroxy-3-phenyl-
piperidino)-p-bromo-propiophenone 4-benzoyl-4-hydroxy-3-phenylpiperidine is reacted with p-bromophenyl-vinylketone in accordance with the process described in Example 36. The hydrobromide of the title compound has a M.P. of 177° (from ethanol).

Example 49.—3-(4-benzoyl-4-hydroxy-3-phenyl-
piperidino)-m-methoxy-propiophenone 4-benzoyl-4-hydroxy-3-phenylpiperidine is reacted with m-methoxyphenyl-vinylketone in accordance with the process described in Example 36. The hydrobromide of the title compound has a M.P. of 165–166.5° (from ethanol).

Example 50.—3-(4-benzoyl-4-hydroxy-3-phenyl-
piperidino)-m-methyl-propiophenone 4-benzoyl-4-hydroxy-3-phenylpiperidine is reacted with m-tolyl-vinylketone in accordance with the process described in Example 36. The hydrobromide of the title compound has a M.P. of 163–164° (from ethanol/ether).

Example 51.—3-(4-benzoyl-4-hydroxy-3-phenyl-
piperidino) propiophenone [process(c)]

A mixture of 10.0 g. of 4-benzoyl-4-hydroxy-3-phenyl-piperidine hydrochloride, 4.7 g. of paraformaldehyde and 3.7 cc. of acetophenone in 250 cc. of ethanol is heated to the boil while stirring for 21 hours. The residue resulting after evaporation of the solvent is treated with potassium carbonate in order to liberate the base, and the reaction product is extracted with chloroform. The crude base resulting after evaporation of the chloroform is dissolved in ethanol, the calculated amount of hydrogen bromide in glacial acetic acid is added and dilution is effected with ether until the solution turns slightly turbid. The resulting crystalline product is again recrystallized from ethanol. The pure 3-(4-benzoyl-4-hydroxy-3-phenylpiperidino) propiophenone hydrobromide has a M.P. of 182–184°.

Example 52.——3-(4-benzoyl-4-hydroxy-3-phenyl-
piperidino)-p-methoxy-propiophenone 4-benzoyl-4-hydroxy - 3 - phenylpiperidine, paraformaldehyde and p-methoxy-acetophenone are reacted together in accordance with the process described in Example 51. The hydrobromide of the title compound has a M.P. of 170–172° (from ethanol).

Example 53.—3-(4-benzoyl-4-hydroxyl-3-phenyl-
piperidino)-p-fluoro-propiophenone 4-benzoyl-4-hydroxy-3 - phenylpiperidine, paraformaldehyde and p-fluoro-acetophenone are reacted together in accordance with the process described in Example 51. The hydrobromide of the title compound has a M.P. of 116–118° (from ethanol).

Example 54.—3-(4-benzoyl-4-hydroxy-3-phenyl-
piperidino)-p-chloro-propiophenone 4-benzoyl-4-hydroxy - 3 - phenylpiperidine, paraformaldehyde and p-chloro-acetophenone are reacted together in accordance with the process described in Example 51. The hydrobromide of the title compound has a M.P. of 119–121° (from ethanol).

Example 55.—3-(4-benzoyl-4-hydroxy-3-phenyl-
piperidino)-p-bromo-propiophenone 4-benzoyl-4-hydroxy - 3 - phenylpiperidine, paraformaldehyde and p-bromo-acetophenone are reacted together in accordance with the process described in Example 51. The hydrobromide of the title compound has a M.P. of 177° (from ethanol).

Example 56.—3-(4-benzoyl-4-hydroxy-3-phenyl-piperidino)-m-methoxy-propiophenone 4-benzoyl-4-hydroxy - 3 - phenylpiperidine, paraformaldehyde and m-methoxy-acetophenone are reacted together in accordance with the process described in Example 51. The hydrobromide of the title compound has a M.P. of 165–166.5° (from ethanol).

Example 57.—3-(4-benzoyl-4-hydroxy-3-phenyl-piperidino)-m-methyl-propiophenone 4-benzoyl-4-hydroxy - 3 - phenylpiperidine, paraformaldehyde and m-methyl-acetophenone are reacted together in accordance with the process described in Example 51. The hydrobromide of the title compound has a M.P. of 163–164° (from ethanol/ether).

Example 58.—5-(4-benzoyl-4-hydroxy-3-phenyl-piperidino)-2,2-dimethyl-3-pentanone 4-benzoyl-4-hydroxy - 3 - phenylpiperidine, paraformaldehyde and methyl tert.butyl ketone are reacted together in accordance with the process described in Example 51. The hydrobromide of the title compound has a M.P. of 187–188.5° (from ethanol).

Example 59.—3-(4-benzoyl-4-hydroxy-3-phenyl-piperidino)-2-propanol [process (d)]

A solution of 13.0 g. of 4-benzoyl-4-hydroxy-3-phenylpiperidine and 8.05 g. of propylene oxide in 110 cc. of ethanol is allowed to stand in a refrigerator (0–5°) for 21 hours. The solution is subsequently evaporated to dryness at reduced pressure, and after allowing to stand for an extended period, the crude title compound which crystallizes is purified by crystallizing twice from ethanol. M.P. 134.5–135.5°.

Example 60.—2-(4-benzoyl-4-hydroxy-3-phenyl-piperidino) ethanol 4-benzoyl-4-hydroxy-3-phenylpiperidine is reacted with ethylene oxide in accordance with the process described in Example 59. The title compound has a M.P. of 113–114.5° (from isopropanol/ether).

Example 61.—4-(4-benzoyl-4-hydroxy-3-phenyl-piperidino)-3-butanol

A solution of 13.0 g. of 4-benzoyl-4-hydroxy-3-phenylpiperidine and 10.5 g. of butylene oxide-1,2 in 110 cc. of ethanol is allowed to stand at room temperature for 48 hours. The solution is subsequently evaporated to dryness at reduced pressure and the resulting title compound is crystallized from benzene/petroleum ether. M.P. 129–130°.

Example 62.—3-(4-benzoyl-4-hydroxy-3-phenyl-piperidino)-2-methyl-2-propanol 4-benzoyl-4-hydroxy-3-phenylpiperidine is reacted with 2-methylpropylene oxide in accordance with the process described in Example 61. The hydrobromide of the title compound has a M.P. of 130–134° (from ethanol).

Example 63.—3-(4'-benzoyl-4'-hydroxy-3'-phenyl-piperidino)-methylthiopropiophenone [process (c)]

A mixture of 15.9 g. 4-benzoyl-4-hydroxy-3-phenylpiperidine hydrochloride, 75 g. paraformaldehyde and 8.3 g. p-methylthioacetophenone in 200 ml. ethanol is heated to the boil while stirring for 20 hours. The residue remaining after evaporation of the solvent is treated with 30% potassium carbonate solution to liberate the base and the reaction product is extracted with benzene. The crude title compound obtained after evaporation of the benzene is dissolved in ethanol, reacted with the calculated amount of ethanolic-hydrochloric acid and dilution is effected with ether until a slight turbidity results. The resulting crystalline product is recrystallized from ethanol/ether. The pure hydrochloride of the title compound has a M.P. of 179–180°.

Example 64.—3-(4'-benzoyl-4'-hydroxy-3'-phenylpiperidino)-p-methylthiopropiophenone [process (a)]

4-benzoyl-4-hydroxy-3-phenylpiperidine hydrochloride is reacted with 3-chloro-p-methylthiopropiophenone in accordance with the process described in Example 1. M.P. of the hydrochloride of the title compound 179–180° (from ethanol/ether).

Example 65.—3-(4'-benzoyl-4'-hydroxy-3'-phenylpiperidino)-p-methylthiopropiophenone [process (b)]

4-benzoyl-4-hydroxy-3-phenylpiperidine is reacted with p-methylthio vinyl ketone in accordance with the process described in Example 36. M.P. of hydrochloride of the title compound 179–180° (decomp.; from ethanol).

What is claimed is:
1. A compound of the formula

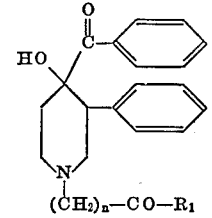

wherein $n$ is an integer from 1 to 4, and
$R_1$ is hydroxy, alkyl of 1 to 4 carbon atoms, alkoxy of 1 to 4 carbon atoms, amino, alkylamino in which the alkyl radical is of 1 to 4 carbon atoms, dialkylamino in which each alkyl radical is of 1 to 4 carbon atoms, phenyl, chloro-phenyl, bromo-phenyl, fluoro-phenyl, alkyl-phenyl in which the alkyl radical is of 1 to 4 carbon atoms, methoxy-phenyl or methylthio-phenyl or a pharmaceutically acceptable acid addition salt thereof.

2. The compound of claim 1, which is (4-benzoyl-4-hydroxy-3-phenylpiperidino) acetone.

3. The compound of claim 1, which is 2-(4-benzoyl-4-hydroxy-3-phenylpiperidino) acetophenone.

4. The compound of claim 1, which is 4-(4-benzoyl-4-hydroxy-3-phenylpiperidino)-2-butanone.

5. The compound of claim 1, which is 3-(4-benzoyl-4-hydroxy-3-phenylpiperidino) propiophenone.

6. The compound of claim 1, which is 4-(4-benzoyl-4-hydroxy-3-phenylpiperidino)-p-fluoro-butyrophenone.

7. The compound of claim 1, which is 5-(4-benzoyl-4-hydroxy-3-phenylpiperidino)-2-methyl-3-pentanone.

8. The compound of claim 1, which is 5-(4-benzoyl-4-hydroxy-3-phenylpiperidino)-2-pentanone.

9. The compound of claim 1, which is 6-(4-benzoyl-4-hydroxy-3-phenylpiperidino)-2-hexanone.

10. The compound of claim 1, which is 4-(4-benzoyl-4-hydroxy-3-phenylpiperidino)-2,2-dimethyl-3-butanone.

11. The compound of claim 1, which is 2-(4-benzoyl-4-hydroxy-3-phenylpiperidino) acetic acid methyl ester.

12. The compound of claim 1, which is 4-(4-benzoyl-4-hydroxy-3-phenylpiperidino) butyric acid ethyl ester.

13. The compound of claim 1, which is 4-(4-benzoyl-4-hydroxy-3-phenylpiperidino) butyric acid.

14. The compound of claim 1, which is 2-(4-benzoyl-4-hydroxy-3-phenylpiperidino) acetic acid.

15. The compound of claim 1, which is 2-(4-benzoyl-4-hydroxy-3-phenylpiperidino) acetamide.

16. The compound of claim 1, which is 5-(4-benzoyl-4-hydroxy-3-phenylpiperidino)-2,2-dimethyl-3-pentanone.

17. The compound of claim 1, which is 5-(4-benzoyl-4-hydroxy-3-phenylpiperidino)-3-pentanone.

18. The compound of claim 1, which is 6-(4-benzoyl-4-hydroxy-3-phenylpiperidino)-2-methyl-4-hexanone.

19. The compound of claim 1, which is 3-(4-benzoyl-4-hydroxy-3-phenylpiperidino) propionic acid ethyl ester.

20. The compound of claim 1, which is 3-(4-benzoyl-4-hydroxy-3-phenylpiperidino) propionic acid.

21. The compound of claim 1, which is 3-(4-benzoyl-4-hydroxy-3-phenylpiperidino)-N-methyl-propionamide.

22. The compound of claim 1, which is 3-(4-benzoyl-4-hydroxy-3-phenylpiperidino)-N,N-diethyl-propionamide.

23. The compound of claim 1, which is 3-(4-benzoyl-4 - hydroxy - 3 - phenylpiperidino) - p - methoxy - propiophenone.

24. The compound of claim 1, which is 3-(4-benzoyl-4-hydroxy-3-phenylpiperidino)-p-fluoro-propiophenone.

25. The compound of claim 1, which is 3-(4-benzoyl-4-hydroxy-3-phenylpiperidino)-p-chloro-propiophenone.

26. The compound of claim 1, which is 3-(4-benzoyl-4-hydroxy-3-phenylpiperidino)-p-bromo-propiophenone.

27. The compound of claim 1, which is 3-(4-benzoyl-4 - hydroxy - 3 - phenylpiperidino) - m - methoxy - propiophenone.

28. The compound of claim 1, which is 3-(4-benzoyl-4-hydroxy-3-phenylpiperidino)-m-methyl-propiophenone.

29. The compound of claim 1, which is 3-(4-benzoyl-4-hydroxy-3-phenylpiperidino) propionic acid amide.

30. The compound of claim 1, which is 3-(4-benzoyl-4 - hydroxy - 3 - phenylpiperidino) - p - methylthiopropiophenone.

31. A compound of the formula:

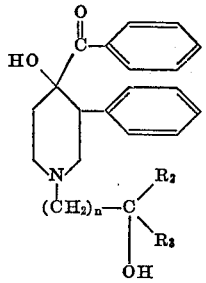

wherein $n$ is an integer from 1 to 4, and $R_2$ and $R_3$ are hydrogen or alkyl of 1 to 4 carbon atoms.

32. The compound of claim 31, which is 3-(4-benzoyl-4-hydroxy-3-phenylpiperidino) propanol.

33. The compound of claim 31, which is 4-(4-benzoyl-4-hydroxy-3-phenylpiperidino) butanol.

34. The compound of claim 31, which is 3-(4-benzoyl-4-hydroxy-3-phenylpiperidino)-2-propanol.

35. The compound of claim 31, which is 2-(4-benzoyl-4-hydroxy-3-phenylpiperidino) ethanol.

36. The compound of claim 31, which is 4-(4-benzoyl-4-hydroxy-3-phenylpiperidino)-3-butanol.

37. The compound of claim 31, which is 3-(4-benzoyl-4-hydroxy-3-phenylpiperidino)-2-methyl-2-propanol.

References Cited
UNITED STATES PATENTS

| | | | |
|---|---|---|---|
| 3,029,244 | 4/1962 | Lyle et al. | 260—293.8 |
| 3,080,372 | 3/1963 | Janssen | 260—293.73 |
| 3,518,276 | 6/1970 | Janssen | 260—293.8 |
| 3,539,581 | 11/1970 | Moffett | 260—293.8 |
| 3,576,810 | 4/1971 | Duncan et al. | 260—293.83 |
| 3,591,593 | 7/1971 | Thiele et al. | 260—293.8 |

HENRY R. JILES, Primary Examiner
S. D. WINTERS, Assistant Examiner

U.S. Cl. X.R.

260—293.76, 293.8, 295 R